United States Patent [19]

Teyssie et al.

[11] Patent Number: 5,266,667
[45] Date of Patent: Nov. 30, 1993

[54] METHOD AND SYSTEM FOR PRIMING ANIONIC POLYMERIZATION OF (METH)ACRYLATES

[75] Inventors: Philippe Teyssie, Neuville en Condroz; Roger Fayt, Neupre; Sunil K. Varshney, Grivegnee, all of Belgium

[73] Assignee: Elf Atochem S.A., France

[21] Appl. No.: 777,305

[22] PCT Filed: May 31, 1990

[86] PCT No.: PCT/FR90/00378

§ 371 Date: Nov. 29, 1991

§ 102(e) Date: Nov. 29, 1991

[87] PCT Pub. No.: WO90/15083

PCT Pub. Date: Dec. 13, 1990

[30] Foreign Application Priority Data

Jun. 2, 1989 [FR] France ................. 89 07327

[51] Int. Cl.$^5$ ................. C08F 20/10; C08F 4/54
[52] U.S. Cl. ................. 526/174; 526/175; 526/178; 526/181; 526/185; 526/183; 526/329.1; 526/329.2; 526/329.5; 526/329.7; 502/152; 502/154; 502/155; 502/157; 502/202
[58] Field of Search ............. 526/174, 175, 178, 181, 526/182, 183, 329.7; 502/152, 154, 155, 157, 202

[56] References Cited

U.S. PATENT DOCUMENTS

| 3,294,768 | 12/1968 | Wofford ............. | 526/175 X |
| 3,526,604 | 9/1970 | Wadsworth ........... | 526/190 X |
| 4,647,634 | 3/1987 | Jalics ............... | 526/175 X |
| 4,767,824 | 8/1988 | Ouhadi et al. ....... | 526/174 X |

FOREIGN PATENT DOCUMENTS 0185641 6/1986 European Pat. Off. .
1094986 12/1960 Fed. Rep. of Germany .

Primary Examiner—Fred Teskin
Attorney, Agent, or Firm—Finnegan, Henderson, Farabow, Garrett & Dunner

[57] ABSTRACT

This system for priming the animic polymerization of (meth)acrylates includes at least one primer of the formula R—M (I) in which M represents a metal selected from alkaline and alkaline earth metals and R represents an alkyl radical with a straight or branched chain containing 2 to 6 atoms of carbon or an aryl radical or an arylalkyl radical. H is characterized in that it further contains at least one organic derivative of an alkaline metal, with the proviso that said organic derivative is neither an alcoholate nor a carboxyl acid ester substituted in position α by said metal. Applications in the anionic polymerization of (meth)acrylates.

13 Claims, No Drawings

METHOD AND SYSTEM FOR PRIMING ANIONIC POLYMERIZATION OF (METH)ACRYLATES

The present invention relates to a process for the polymerisation of acrylic monomers and optionally of nonacrylic comonomers with the aid of initiating agents or polymerisation initiators of formula:

$$R—M \qquad (I)$$

in which M denotes a metal chosen from alkali and alkaline-earth metals and R denotes a straight- or branched-chain alkyl radical containing 2 to 6 carbon atoms or an aryl radical.

Processes for the polymerisation of acrylic or methacrylic monomers such as alkyl acrylates and methacrylates are known, as well as processes for the copolymerisation of such acrylic or methacrylic monomers as well as of nonacrylic comonomers, in the presence of various initiating agents or polymerisation initiators, especially those of formula (I) given above, such as sec-butyllithium and other initiating agents, such as lithium tertiary alcoholates.

From patent application Ser. No. EP-A-185,641 it is also known to employ, in polymerisation reactions of acrylic and methacrylic monomers as well as in copolymerisation reactions of such monomers and of nonacrylic comonomers, cocatalysts or additives consisting of alkali or alkaline-earth metal salts, preferably halides of such a metal. These cocatalysts make it possible to avoid secondary reactions and make it possible to obtain polymers with a polydispersity index ($M_w/M_n$ ratio) which is very low.

However, two problems remain to be solved in these processes: on the one hand, that of the reaction kinetics and, on the other hand, that of the control of the molecular mass of the polymers. In fact, the use of an alkali or alkaline-earth metal salt decreases the reactivity of the initiating agent, and this can be detrimental to the output efficiency of the process through a lengthening of the period needed for a complete conversion of the monomer. Furthermore, in the case where the acrylic monomer is methyl methacrylate, these known processes make it easily possible to obtain polymers of high molecular mass. On the other hand, they appear to be poorly adapted to yielding polymers or copolymers comprising a polymethyl methacrylate block whose number-average molecular mass is, for example, lower than 35,000.

The present invention is based on the surprising finding that, in order to solve at least one of the problems outlined above, it is advantageous to carry out the polymerisation of acrylic or methacrylic monomers, if appropriate with nonacrylic comonomers, with the aid of a catalyst of formula (I) which is given above, by employing a cocatalyst or additive consisting of an organic derivative of an alkali metal, on condition that this organic derivative is neither an alcoholate nor an ester of a carboxylic acid substituted by the said metal in the α position.

Thus, a first subject of the present invention consists of an initiating system for the anionic polymerisation of (meth)acrylates, comprising at least one initiator of formula R—M (I) in which M denotes a metal chosen from alkali and alkaline-earth metals and R denotes a straight- or branched-chain alkyl radical containing from 2 to 6 carbon atoms or an aryl radical or an arylalkyl radical, characterised in that it additionally comprises at least one organic derivative of an alkali metal, on condition that this organic derivative is neither an alcoholate nor an ester of a carboxylic acid substituted by the said metal in the α position.

Among the organic alkali metal derivatives which can be employed within the scope of the present invention there may be mentioned especially the derivatives in which the alkali metal is associated with a group chosen from:

(A) the groups, of formula:

$$\text{O—C—R}_1 \qquad (II)$$
$$\underset{\text{O}}{\|}$$

in which $R_1$ is a linear or branched alkyl radical containing from 1 to 20 carbon atoms or else a cycloalkyl radical containing from 3 to 20 carbon atoms or, again, an aryl radical containing from 6 to 14 carbon atoms, (B) the groups of formula:

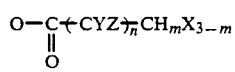

$$\text{O—C}(\text{CYZ})_n\text{CH}_m\text{X}_{3-m} \qquad (III)$$
$$\underset{\text{O}}{\|}$$

in which:

Y and Z, which are identical or differ from each other, are chosen from the hydrogen atom and halogen atoms;

n is an integer ranging from 0 to 4,

X is a halogen atom, and m is an integer ranging from 0 to 2, (C) the groups of formula:

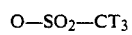

$$\text{O—SO}_2\text{—CT}_3 \qquad (IV)$$

in which T is chosen from the hydrogen atom and halogen atoms, and (D) the groups of formula:

$$B(R_2)_4 \qquad (V)$$

in which $R_2$ is chosen from the hydrogen atom and alkyl and aryl radicals.

Examples of groups of formula (II) are acetate, propionate and benzoate groups. Examples of groups of formula (III) are α-bromoacetate and trifluoroacetate groups. Examples of groups of formula (IV) are trifluoromethanesulphonic and methanesulphonic groups. Examples of groups (V) are borohydride and tetraphenylboride groups.

The molar ratio of the organic alkali metal derivative to the initiator in the initiating system according to the invention may vary within very wide limits. However, obtaining specific results in the polymerisation of the (meth)acrylates is generally dependent on the choice of a molar ratio of between approximately 0.3 and approximately 15, although larger quantities of organic derivative cannot be detrimental. In order to solve the problems which the present invention addresses, the quantity of organic derivative must be sufficient to permit the formation of a complex with the polymerisation active centre and thereby to stabilise the latter.

A second subject of the present invention consists of a process for the polymerisation of (meth)acrylates and optionally of vinyl comonomers with the aid of at least one initiator of formula R—M (I) in which M denotes a metal chosen from alkali and alkaline-earth metals and R denotes a straight- or branched-chain alkyl radical containing 2 to 6 carbon atoms or an aryl radical or an arylalkyl radical, characterised in that the polymerisation is carried out in the additional presence of at least one organic derivative of an alkali metal, on condition that this organic derivative is neither an alcoholate nor an ester of a carboxylic acid substituted by the said metal in the $\alpha$ position.

The initiator of formula (I) and the organic alkali metal derivative form together a system for initiating polymerisation in accordance with the first subject of the present invention, and for which reference will be made to the detailed description below.

Initiators of formula R—M (I) which can be employed in the process according to the invention are especially diphenylmethyl sodium, diphenylmethyl potassium and 1,4-disodio-1,1,4,4-tetraphenylbutane, $\alpha$-methylstyryllithium, diphenylmethyllithium, sec-butyllithium, n-butyllithium, naphthalenesodium, 1,1-diphenyl-3-methylpentyllithium and 1,1-diphenylhexyllithium.

The process according to the invention is particularly advantageous for obtaining tertiary polyacrylates by direct polymerisation, and for obtaining block copolymers comprising a tertiary polyacrylate block in combination with a polymethacrylate block.

The tertiary acrylates which can be subjected to the polymerisation process according to the invention are especially tertiary alkyl acrylates in which the alkyl group contains from 4 to 10 carbon atoms, more particularly tert-butyl acrylate, 2-ethylhexyl acrylate and 3,5,5-trimethylhexyl acrylate.

The process according to the invention is also advantageous for the polymerisation of methyl methacrylate, ethyl methacrylate, tert-butyl methacrylate and of their homologues, and for obtaining block copolymers comprising a polymethacrylate block in combination with a polymer block derived from a nonacrylic comonomer.

A nonacrylic comonomer which is advantageously employed in the process according to the invention is a vinyl comonomer such as, for example, butadiene, isoprene, styrene, vinylnaphthalene, 2-vinylpyridine, 4-vinylpyridine, alpha-methylstyrene and tert-butylstyrene.

The proportion of alkali metal alcoholate employed in the process according to the invention may vary greatly in relation to the initiator. As will be readily understood., this proportion depends on the initiator chosen, on the (meth)acrylate polymerised and on the nonacrylic comonomer, and can be easily determined as a function of the intended objective.

The polymerisation or copolymerisation in the process in accordance with the invention is preferably carried out in the absence of moisture and oxygen and in the presence of at least one solvent preferably chosen from aromatic solvents such as benzene and toluene, or else tetrahydrofuran, diglyme, tetraglyme, ortho-terphenyl, biphenyl, decalin or, again, tetralin.

The polymerisation temperature may vary approximately between $-80°$ and $0°$ C.

The process according to the invention makes it possible to prepare with good kinetics a whole range of polymers comprising at least one tertiary alkyl acrylate block, the alkyl group containing from 4 to 10 carbon atoms and having a number-average molecular mass which is generally approximately between 1,000 and 20,000 and a molecular mass polydispersity index (defined as the ratio of the weight-average molecular mass to the number-average molecular mass) which is generally approximately between 1.2 and 4, as determined by exclusion chromatography.

The process according to the invention also makes it possible to prepare a whole range of polymethacrylates such as those defined above, which have a number-average molecular mass which is generally between 7,000 and 35,000 and a molecular mass polydispersity index, defined and determined as above, which is 9generally approximately between 1.05 and 1.9.

The following examples are given by way of illustration without limiting the present invention.

In all these examples, the exclusion chromatography was performed by employing a Waters GPC 501 apparatus equipped with two linear columns, with tetrahydrofuran as eluent at a flow rate of 1 ml/min. The number-average molecular masses were determined by means of an HP 502 membrane osmometer.

EXAMPLE 1

$0.7 \times 10^{-3}$ mol of sodium tetraphenylboride, purified beforehand and then stored under inert atmosphere in the absence of light, is introduced under nitrogen atmosphere into a predried round bottom flask. 100 ml of predried tetrahydrofuran are added to it, followed, with stirring, dropwise, by $1.23 \times 10^{-3}$ mol of sec-butyllithium in solution in toluene. The mixture is cooled to a temperature of $-78°$ C. with a mixture of acetone and solid carbon dioxide and then a solution containing 0.081 mol of 2-ethylhexyl acrylate in toluene is added, still at $-78°$ C., the said acrylate having been previously stirred for 48 hours over calcium hydride, then distilled and treated with fluorenyllithium until the appearance of a permanent yellow colour, and finally distilled over triethylaluminium immediately before polymerisation.

The reaction is stopped after 4 hours by adding 5 ml of methanol, after which the solvent is stripped off. Poly-2-ethylhexyl acrylate is obtained in a 73% yield. Analysis of the polymer by exclusion chromatography indicates a number-average molecular mass of 1,650.

EXAMPLE 2

The experiment of Example 1 is reproduced, with sec-butyllithium being replaced with $0.9 \times 10^{-3}$ mol of naphthalenesodium and using $0.67 \times 10^{-3}$ mol of sodium tetraphenylboride and 17 g of 2-ethylhexyl acrylate. After 4 hours, reaction poly-2-ethylhexyl acrylate is obtained in 100% yield. Analysis of the polymer by exclusion chromatography shows the following characteristics:

$$M_n = 10,200 \quad M_w/M_n = 3.1$$

EXAMPLE 3

The experimental procedure of Example 1 is reproduced while the ingredients are modified as follows:
 $\alpha$-methylstyryllithium $= 10^{-3}$ mol
 sodium tetraphenylboride $= 2 \times 10^{-3}$ mol
 monomer $= 10$ g of tert-butyl acrylate.

After 15 minutes' reaction a tert-butyl polyacrylate which has the following characteristics is obtained in a 93% yield:

$M_n = 17,000 \quad M_w/M_n = 3.9$

EXAMPLE 4

The experimental procedure of Example 1 is reproduced, the ingredients being modified as follows:
diphenylmethyllithium = $0.4 \times 10^{-3}$ mol
lithium tetraphenylboride = $0.4 \times 10^{-3}$ mol
3,5,5-trimethylhexyl acrylate = 10 g.

After 4 hours' reaction a polymer which has the following characteristics is obtained:

$M_n = 1,050 \quad M_w/M_n = 1.3$

EXAMPLE 5

The experimental procedure of Example 1 is reproduced, the ingredients being modified as follows:
α-methylstyryllithium = $0.46 \times 10^{-3}$ mol
lithium trifluorosulphonate = $0.92 \times 10^{-3}$ mol
methyl methacrylate = 4.7 g After 15 minutes' reaction a polymethyl methacrylate which has the following characteristics is obtained in 100% yield:

$M_n = 33,000 \quad M_w/M_n = 1.1$

EXAMPLE 6

The experimental procedure of Example 1 is reproduced, the ingredients being modified as follows:
α-methylstyryllithium = $0.46 \times 10^{-3}$ mol
lithium trifluoroacetate = $0.92 \times 10^{-3}$ mol
methyl methacrylate = 1.7 g After 15 minutes' reaction a polymethyl methacrylate which has the following characteristics is obtained in a 91% yield:

$M_n = 7,000 \quad M_w/M_n = 1.3$

EXAMPLE 7

By reproducing the experiment of Example 5, with the exception of the polymerisation temperature raised to −40° C., a polymethyl methacrylate which has the following characteristics is obtained in 100% yield:

$M_n = 16,500 \quad M_w/M_n = 1.3$

EXAMPLE 8

By reproducing the experiment of Example 6, with the exception of the polymerisation temperature raised to −40° C., a polymethyl methacrylate which has the following characteristics is obtained in a 81% yield:

$M_n = 10,500 \quad M_w/M_n = 1.5.$

EXAMPLE 9

The experimental procedure of Example 1 is reproduced, the polymerisation temperature being raised to −40° C. and the ingredients being modified as follows:
α-methylstyryllithium = $0.25 \times 10^{-3}$ mol
lithium acetate = $0.50 \times 10^{-3}$ mol
methyl methacrylate = 4.5 g After 20 minutes' reaction a polymethyl methacrylate which has the following characteristics is obtained in 100% yield:

$M_n = 25,000 \quad M_w/M_n = 1.3$

EXAMPLE 10

The experimental procedure of Example 1 is reproduced, the polymerisation temperature being raised to −20° C. and the polymerisation being carried out in a mixture consisting of 80% by weight of toluene and 20% by weight of tetrahydrofuran. The ingredients are the following:
α-methylstyryllithium = $0.24 \times 10^{-3}$ mol
lithium trifluorosulphonate = $0.48 \times 10^{-3}$ mol
tert-butyl acrylate = 4.5 g After 20 minutes' reaction a polymer which has the following characteristics is obtained in 100% yield:

$M_n = 19,000 \quad M_w/M_n = 1.5$

We claim:

1. An initiating system comprising at least one initiator of the formula (I):

$$R\text{—}M \qquad (I)$$

in which:
M is an alkali metal or an alkaline-earth metal, and
R is a straight- or branched-chain alkyl radical containing from 2 to 6 carbon atoms, an aryl radical or an arylalkyl radical; and an additional compound of $BH_4$ which is associated with an alkali metal or of at least one organic derivative of an alkali metal wherein the organic group associated with the alkali metal is represented by formula (III), (IV) or (V):

in which:
Y and Z, which are identical or different from each other, are a hydrogen atom or a halogen atom,
n is an integer ranging from 0 to 4,
x is a halogen atom, and
m is an integer ranging from 0 to 2;

$$O\text{—}SO_2\text{—}CT_3 \qquad (IV)$$

in which:
T is a hydrogen atom or a halogen atom;

$$B(R_2)_4 \qquad (V)$$

in which:
$R_2$ is an alkyl radical or an aryl radical.

2. An initiating system according to claim 1, wherein the molar proportion of said $BH_4$ associated with an alkali metal or of said at least one organic derivative of an alkali metal to the initiator is at least 0.3 and does not exceed 15.

3. An initiating system according to either claim 1 or claim 2, wherein said at least one organic group associated with said alkali metal is an α-bromoacetate, a trifluoroacetate, a methanesulphonic, a trifluoromethanesulphonic, or a tetraphenylboride group.

4. An initiating system according to claim 1 wherein the additional compound is an organic derivative of an alkali metal.

5. A process for the polymerization of (meth)acrylates and of vinyl comonomers comprising a polymerization in the presence of at least one initiator of formula (I):

$$R-M \quad (I)$$

in which:

M is an alkali metal or an alkaline-earth metal, and

R is a straight- or branched-chain alkyl radical containing 2 to 6 carbon atoms, an aryl radical or an arylalkyl radical;

and an additional compound of $BH_4$ associated with an alkali metal or of at least one organic derivative of an alkali metal wherein the organic group associated with the alkali metal is represented by formula (II), (III), (IV) or (V):

$$O-\underset{\underset{O}{\|}}{C}-R_1 \quad (II)$$

in which:

$R_1$ is a linear or branched alkyl radical containing from 1 to 20 carbon atoms, a cycloalkyl radical containing from 3 to 20 carbon atoms, or an aryl radical containing from 6 to 14 carbon atoms;

$$O-\underset{\underset{O}{\|}}{C}-(CYZ)_n-CH_mX_{3-m} \quad (III)$$

in which:

Y and Z, which are identical or different from each other, are a hydrogen atom or a halogen atom, n is an integer ranging from 0 to 4, x is a halogen atom, and m is an integer ranging from 0 to 2;

$$O-SO_2-CT_3 \quad (IV)$$

in which:

T is a hydrogen atom or a halogen atom;

$$B(R_2)_4 \quad (V)$$

in which:

$R_2$ is an alkyl radical or an aryl radical.

6. A process according to claim 5, wherein the molar proportion of said $BH_4$ associated with an alkali metal or of said at least one organic derivative of an alkali metal to the initiator is at least 0.3 and does not exceed 15.

7. A process according to either claim 5 or 6, wherein said organic group associated with said alkali metal is an acetate, a propionate, a benzoate, an α-bromoacetate, a trifluoroacetate, a methanesulphonic, a trifluoromethanesulphonic, and a tetraphenylboride group.

8. A process according to claims 5 or 6, wherein the polymerization is carried out at a temperature of between −80° C. and 0° C.

9. A process according to claims 5 or 6, wherein the polymerization is carried out in the presence of at least one solvent.

10. A process according to claim 9, wherein said solvent is tetrahydrofuran.

11. A process according to claim 9, wherein said solvent is toluene.

12. A process according to one of claim 5 or 11, wherein said (meth)acrylate is a methyl methacrylate or a tertiary alkyl acrylate.

13. A process according to claim 5 wherein the additional compound is an organic derivative of an alkali metal.

* * * * *

UNITED STATES PATENT AND TRADEMARK OFFICE
CERTIFICATE OF CORRECTION

PATENT NO. : 5,266,667
DATED : November 30, 1993
INVENTOR(S) : Philippe Teyssie, Roger Fayt, Sunil K. Varshney It is certified that error appears in the above-indentified patent and that said Letters Patent is hereby corrected as shown below:

Claim 1, col. 6, line 49, "x" should read --X--.

Claim 5, col. 8, line 4, "x" should read --X--.

Signed and Sealed this

Twenty-second Day of February, 1994

*Attest:*

BRUCE LEHMAN

*Attesting Officer*   *Commissioner of Patents and Trademarks*